Dec. 21, 1937. L. T. SACHTLEBEN 2,103,042
FILM HANDLING APPARATUS
Filed Oct. 31, 1935

Inventor
Lawrence T. Sachtleben
by T. R. Goldsborough
Attorney

Witnesses:

Patented Dec. 21, 1937

2,103,042

UNITED STATES PATENT OFFICE 2,103,042

FILM HANDLING APPARATUS

Lawrence T. Sachtleben, Camden, N. J., assignor to Radio Corporation of America, a corporation of Delaware Application October 31, 1935, Serial No. 47,670

3 Claims. (Cl. 242—75)

This invention relates to film handling apparatus, and more particularly to means for and a method of providing constant tension in a film or tape as it is unwound from a supply reel.

In motion picture and like apparatus, whether it be a projector, recorder, or camera, the reel which supplies the photographic film is usually mounted for free rotation and the film is unwound therefrom by a constantly moving driven element, such as a sprocket. As the film is drawn from the supply reel by the sprocket, the reel spins around one or more turns since it is unrestrained, and a loose span of film results between the reel and the sprocket. Thereafter, the sprocket takes up this span and finally, when the film is taut again, the reel is given another jerk or spin to provide another loose span of film. This results in uneven tension in the film and not only causes uneven stretching thereof but at times even results in tearing or other damage.

The primary object of my invention is to provide an improved supply reel which will not be subject to the foregoing difficulty.

More specifically, it is an object of my invention to provide an improved supply reel for films which will maintain constant tension in the film as it leaves the reel.

Another object of my invention is to provide an improved film supply reel as aforesaid which will not permit a loose span to accumulate between it and the film drawing mechanism.

A further object of my invention is to provide an improved film supply reel of the type set forth which is simple in construction, which is highly efficient in use, and which can readily be controlled in its action.

In accordance with my invention, I provide a brake pad for the reel arranged in such a manner that it will automatically adjust itself in accordance with the amount of film remaining on the reel to be drawn off therefrom, the distance from the brake pad to the center of the reel being proportional to the instantaneous diameter of the film on the reel. Thus, as the amount of film on the reel is gradually diminished, the pad will gradually approach the center of the reel and since the braking force applied thereby is proportional to the diameter of the coiled film on the reel, the tension on the film will remain constant.

Figure 1:
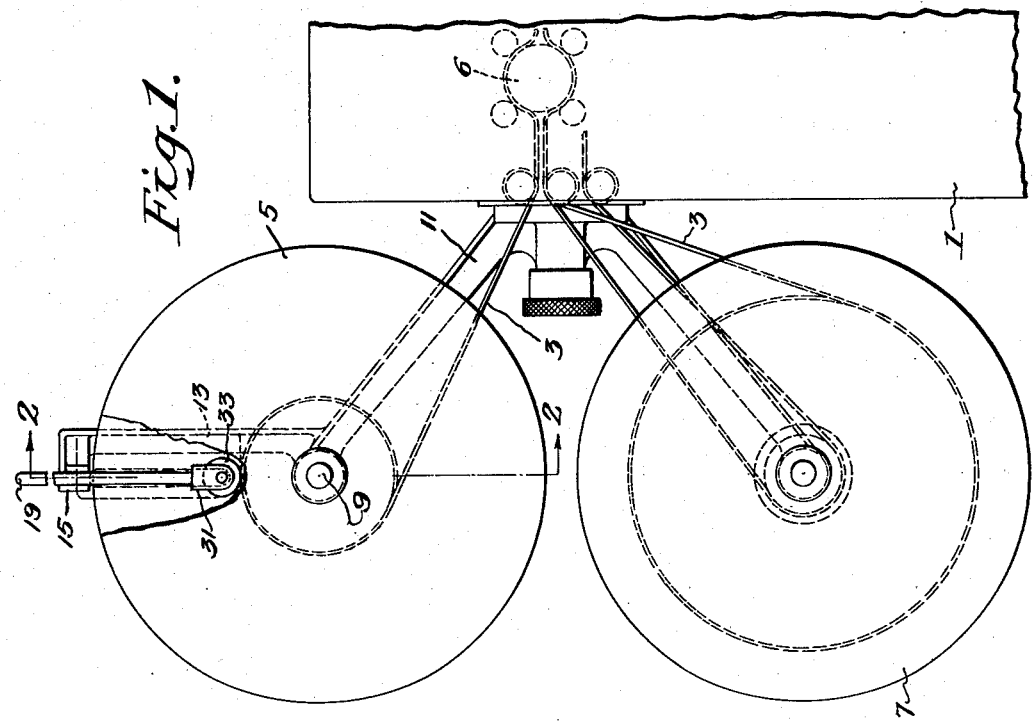
Figure 2:
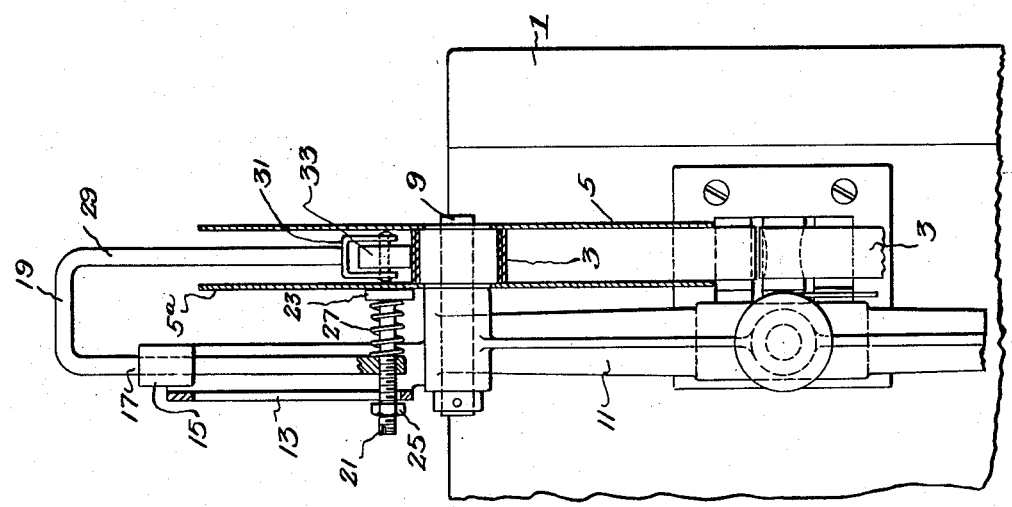

The novel features that I consider characteristic of my invention are set forth with particularity in the appended claims. However, the invention itself, both as to its organization and method of operation, together with additional objects and advantages thereof, will best be understood from the following description of a specific embodiment thereof, when read in connection with the accompanying drawing, in which Figure 1 is a side elevation of my improved supply reel and mounting therefor, with a portion broken away for the sake of clearness, and Fig. 2 is an enlarged sectional view taken on the line 2—2 of Fig. 1.

Referring more specifically to the drawing, wherein similar reference characters designate corresponding parts throughout, there is shown a moving picture or other machine 1 through which a film or tape 3 is drawn from a supply reel 5 on which the film is wound in spiral fashion, the film being drawn from the reel 5 by suitable means, such as a sprocket 6, and being wound up on a take-up reel 7 after leaving the machine 1. The supply reel 5 is locked to a freely rotatable shaft 9 carried by a reel bracket 11 which is mounted on the casing of the machine 1 and, in constructions of the prior art, is free to rotate with the shaft 9.

In order to control the rotation of the reel 5, I provide the bracket 11 with an extension 13 having a guide 15 thereon for the reception of the arm 17 of a U-shaped member 19. The arm 17 is apertured to receive a pin or rod 21 which, at one end, carries a brake pad 23 adapted to bear against the side plate 5a of the reel 5. The other end of the pin 21 is threaded for the reception of a nut 25 which may be adjusted to determine the pressure of the brake pad 23 against the plate 5a, while a coil spring 27, interposed between the arm 17 and the pad 23, constantly urges the brake pad against the plate 5a. It is obvious that by moving the brake pad 23 radially along the plate 5a, the braking torque will vary depending upon the distance of the pad 23 from the center of the reel. To make this proportional to the amount of film left on the reel, I provide the second arm 29 of the member 19 with a forked end in which is mounted a roller 33 of metal, rubber or any other suitable material. The roller 33 rests upon the periphery or outer turn of the film spiral and, as the spiral is unwound by the removal of film from the reel, the roller gradually approaches the center of the reel. The arm 17 thus lowers by gravity in the guide 15 and carries with it the brake pad 23. The pressure of the pad 23 on the plate 5a may be originally adjusted by means of the nut 25 to produce a desired tension on the film 3, after which it will remain constant and independent of the amount of film on the reel, and the accumulation of a loose span of film between the reel 5 and the sprocket 6 will be avoided.

While I have shown and described but one embodiment of my invention, I am fully aware that many modifications thereof are possible. I desire, therefore, that my invention shall not be limited except insofar as is necessitated by the prior art and by the spirit of the appended claims.

I claim as my invention:

1. In film handling apparatus, the combination of a supply reel mounted for normally free rotation and including a side plate, a film spirally wound on said reel, means for withdrawing said film from said reel, a brake pad mounted for movement radially of said side plate, a roller engaging the periphery of the film spiral and having connection with said brake pad, said roller being arranged to accommodate itself to said spiral periphery regardless of the diameter thereof and to cause movement of said brake pad radially of said side plate whereby the radial distance of said brake pad from the center of said reel is proportional to the diameter of the film spiral at any instant, a spring arranged to constantly press said brake pad against said side plate whereby said brake pad is adapted to restrain free rotation of said reel for maintaining the tension of the span of film between said reel and said withdrawing means constant, and means for varying the tension in said spring whereby to control the braking force applied to said side plate by said brake pad.

2. In film handling apparatus, the combination of a supply reel mounted for normally free rotation and including a side plate, a film spirally wound on said reel, means for withdrawing said film from said reel, a brake pad mounted for movement radially of and arranged to bear against said side plate, a roller engaging the periphery of the film spiral, said roller being arranged to accommodate itself to said spiral periphery regardless of the diameter thereof, and a U-shaped member embracing said side plate and connecting said roller with said brake pad whereby movement of said roller in response to variations in diameter of said spiral effects movement of said brake pad radially of said side plate to maintain the radial distance of said brake pad from the center of said reel always proportional to the diameter of said film spiral, said brake pad being movably mounted on said U-shaped member for movement toward and away from said side plate and serving to restrain free rotation of said reel whereby the tension of the span of film between said reel and said withdrawing means is maintained constant.

3. In film handling apparatus, the combination of a supply reel mounted for normally free rotation and including a side plate, a film spirally wound on said reel, means for withdrawing said film from said reel, a brake pad mounted for movement radially of said side plate, a roller engaging the periphery of the film spiral, said roller being arranged to accommodate itself to said spiral periphery regardless of the diameter thereof, a U-shaped member embracing said side plate and connecting said roller with said brake pad whereby movement of said roller in response to variations in diameter of said spiral effects movement of said brake pad radially of said side plate to maintain the radial distance of said brake pad from the center of said reel always proportional to the diameter of said film spiral, said brake pad being movably mounted on said U-shaped member for movement toward and away from said side plate, a spring arranged to constantly press said brake pad against said side plate whereby said brake pad is adapted to restrain free rotation of said reel for maintaining the tension in the span of film between said reel and said withdrawing means constant, and means for varying the tension in said spring whereby to control the braking force applied to said side plate by said brake pad.

LAWRENCE T. SACHTLEBEN.